(12) United States Patent
D'Hooge et al.

(10) Patent No.: US 6,882,953 B2
(45) Date of Patent: Apr. 19, 2005

(54) STYLUS WITH POSITION SIGNAL TRANSMISSION

(75) Inventors: Herman D. D'Hooge, Hillsboro, OR (US); William C. DeLeeuw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 99 days.

(21) Appl. No.: 10/261,380

(22) Filed: Sep. 30, 2002

(65) Prior Publication Data

US 2003/0028347 A1 Feb. 6, 2003

Related U.S. Application Data

(62) Division of application No. 09/659,212, filed on Sep. 11, 2000, now Pat. No. 6,519,550.

(51) Int. Cl.[7] ............................. G01B 7/14; G01S 5/04; G01C 9/04
(52) U.S. Cl. ................. 702/150; 235/492; 324/207.17; 340/572.1; 342/448; 702/167
(58) Field of Search ............................. 702/94, 95, 150, 702/152, 155, 167, 168, 169; 340/5.8, 572.1; 342/147, 448, 450; 345/427, 448, 821; 235/492; 324/207.17, 207.26; 600/424

(56) References Cited

U.S. PATENT DOCUMENTS

| | | | |
|---|---|---|---|
| 4,384,288 A | 5/1983 | Walton | |
| 4,613,866 A | 9/1986 | Blood | |
| 4,742,356 A | 5/1988 | Kuipers | |
| 4,742,473 A | 5/1988 | Shugar et al. | |
| 5,307,072 A | 4/1994 | Jones | |
| 5,592,180 A | 1/1997 | Yokev et al. | |
| 5,689,628 A | 11/1997 | Robertson | |
| 6,211,666 B1 * | 4/2001 | Acker | 324/207.17 |
| 6,294,997 B1 * | 9/2001 | Paratore et al. | 340/572.1 |
| 6,634,560 B1 * | 10/2003 | Grabau | 235/492 |

* cited by examiner

*Primary Examiner*—John Barlow
*Assistant Examiner*—John Le
(74) *Attorney, Agent, or Firm*—Marger Johnson & McCollom, P.C.

(57) ABSTRACT

A three-dimensional modeling system. The modeling system includes an antenna and a stylus. The stylus has at least one tag that communicates with the antenna to provide position signals of the tag, allowing the stylus to trace the surface of an object into a processor. The system may include more than one antenna, each producing an electromagnetic field within which the object to be modeled is positioned. The stylus may have two tags, which will allow derivation of orientation information from the position signals. The stylus may have a pressure-sensitive tip allowing the communication between the tag and the antenna to be controlled only when the stylus is in contact with the object to be modeled. The system may also have at least one tag attached to the object to provide more accurate information as to the position and orientation of the object relative to the points traced by the stylus. The stylus may also be used to trace an outline or other two-dimensional shape.

6 Claims, 3 Drawing Sheets

STYLUS WITH POSITION SIGNAL TRANSMISSION

This application is a divisional of U.S. application Ser. No. 09/659,212 filed Sep. 11, 2000, now U.S. Pat. No. 6,519,550.

BACKGROUND

1. Field

This disclosure relates to a system and method for scanning objects, more particularly to a system and method for collecting points on the surface of the object from which to create the three-dimensional image.

2. Background

Acquisition of three-dimensional images of objects typically involves several pieces of relatively expensive equipment. A system for acquiring these images may have high quality digital cameras, a precision turntable and sophisticated computer software. High quality digital cameras are set up in a known geometric configuration around the turntable. The cameras then acquire several different images of the object from precisely determined positions. The software then takes all the images and the geometric information and combines them to generate a three-dimensional model of the object's shape.

In addition to the cost and difficulty, obtaining this model may also take several attempts or require extensive fault toleration by the software. Slight variations in the camera location may change the angle of an image acquired, for example. This may result in an inaccurate image or require extra processing to detect and then adjust for the misalignment.

The current approaches to three-dimensional modeling do not allow the typical consumer to obtain three-dimensional models or images for their own use. It would seem advantageous to have a three-dimensional modeling system that is relatively inexpensive, easy to use and does not require sophisticated, expensive modeling software. With the explosion of individual web pages, for both commercial and private use, advances in computer gaming and the increasing sophistication of children as computer users, such a system would find a wide audience and have many uses.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
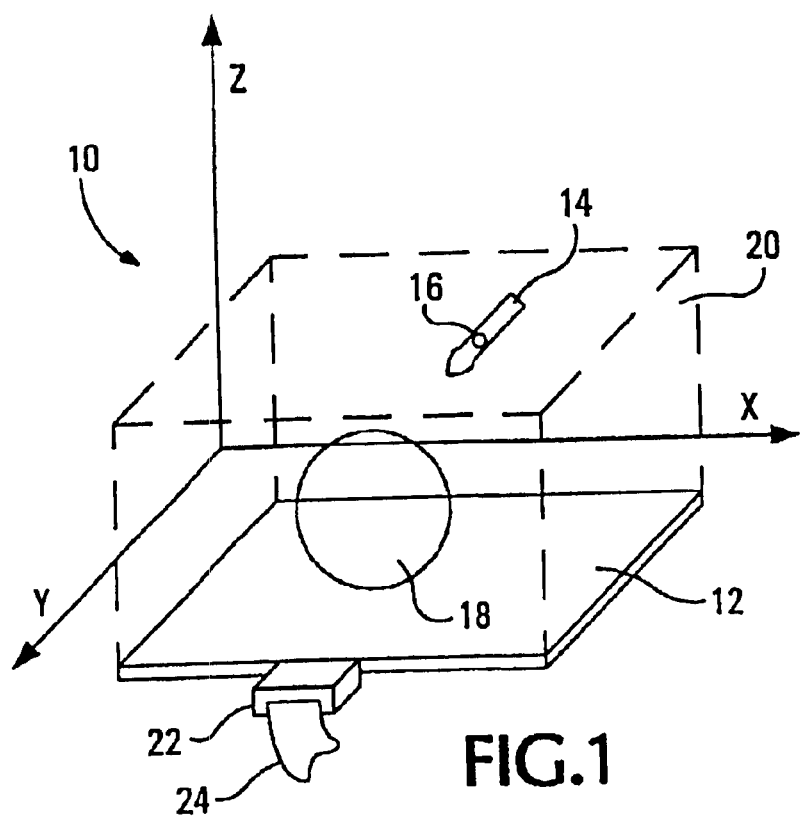
FIG. 1 shows one embodiment of a three-dimensional modeling system, in accordance with the invention.

FIG. 1 shows one embodiment of a three-dimensional modeling system in accordance with the invention. The system 10 has an antenna 12 and a stylus 14. Stylus 14 has at least one radio identifier 16 that is in communication with the antenna 12, as will be discussed further.

Antenna 12 emits an electromagnetic field 20 into a three-dimensional field defined by the x, y and z axes shown. Object 18 is placed or moved into this field. Once it is moved into the field, it is to be kept in a fixed position relative to the antenna 12. The stylus 14, which could be one of several different types of objects, is used to trace the outlines of the object 18. The radio identifier 16 and antenna 12 are in communication such that the antenna can detect the position of the radio identifier within the spatial area. The detection may be active or passive.

If the radio identifier 16, referred to here as a tag, is passive, the tag extracts its power from the energy in the antenna's electromagnetic field. The antenna detects its position by scanning the electromagnetic field for the tag. If the tag is active, it is self-powered, probably by a battery. The active tag will emit a code that is detected by the antenna. In either case, the antenna can detect the position of the tag in the three-dimensional field 20. This allows the user to trace the outline of the object 18 with the stylus and have all of the points recorded by an attached processor, such as that in a personal computer. The processor would receive the data from the antenna 12 through the connector 22, which may be connected by a cable 24, or possibly be a wireless communications link.

In this embodiment, processing the data received and performing an analysis to determine the outline of the object produce the model. This embodiment uses only one tag, so the only signals received will be a series of (x, y, z) points indicating the position of the tag. Since the tag is always in communication with the antenna, all points through which the tag moves will be recorded, including those not on the surface of the object. The processor will have to analyze the data and perform heuristics to discern between the space surrounding the object and the object. The object will more than likely be found by determining those points where there is no data, shown by the 'hollow' non-shaded interiors of the object 18 in FIG. 1.

It must be noted that the above example assumes that only three-dimensional objects may be traced using this system. Some extra advantages do exist for three-dimensional objects, this system could also be used for tracing two-dimensional shapes or outlines. This would provide an easy and convenient method for users to trace both two and three-dimensional objects. Therefore, while the discussion of the system includes embodiments directed to three-dimensional objects, there is not intention of limiting application of the invention to only three-dimensional objects.

Figure 2:
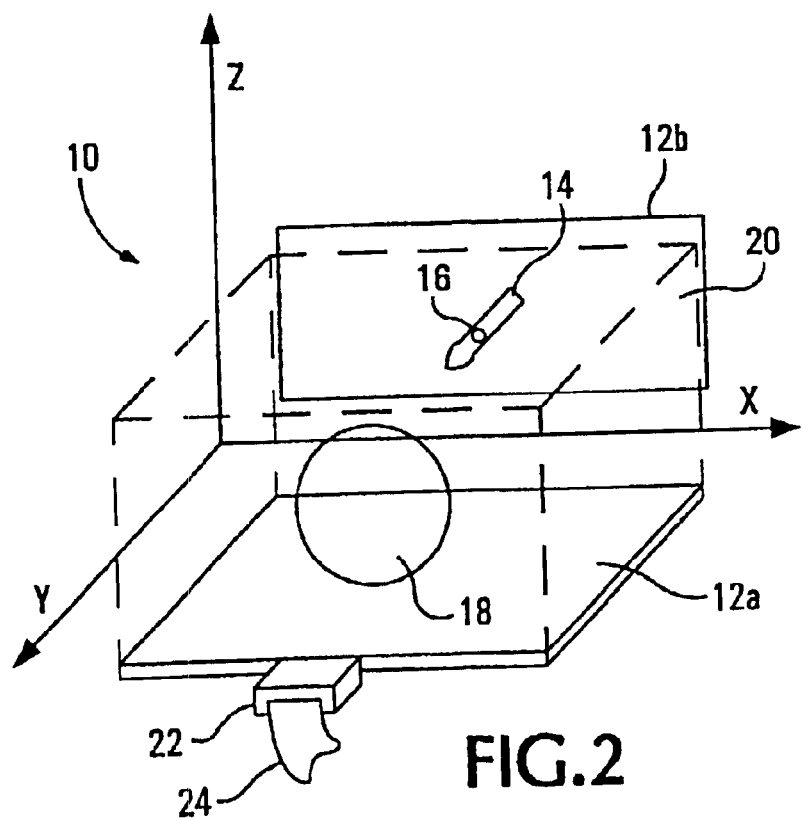
FIG. 2 shows an alternative embodiment of a three-dimensional modeling system in accordance with the invention.

The above example assumes that there is only one antenna 12 that is adjacent to the object being modeled. However, a second antenna could be used to increase accuracy. This is shown in FIG. 2. In this example, a first antenna 12a is in the xy plane of the xyz axes. It generates an electromagnetic field 20 that appear to rise from the xy plane into the z plane. A second antenna is also adjacent the object and adjacent to the first antenna. In this example, the second antenna 12b is positioned in the xz plane and its electromagnetic field, not shown, would appear to come out of the page into the y-axis. The use of two antennas may require some management of the electromagnetic fields to avoid disruption or inaccurate readings, but would afford higher resolution in locating the stylus tag.

Figure 3:
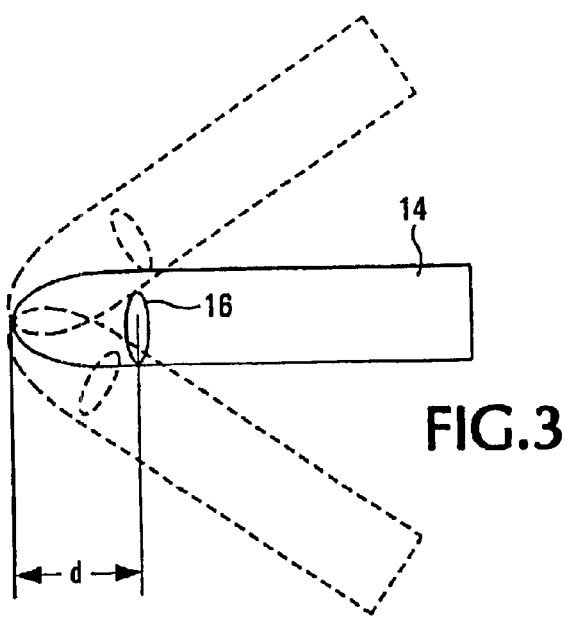
FIG. 3 shows one embodiment of a stylus operable to be used in a three-dimensional modeling system in accordance with the invention.

Another option to increase the accuracy of the location and therefore the accuracy of the data collected focuses on the stylus. It is more than likely that the tag will not be mounted exactly on the tip of the stylus. An example of the stylus 14 is shown in FIG. 3. The tag 16 is displaced from the tip of the stylus 14 by a distance d. For example the stylus may contact the object at one point while in the position shown. If the stylus pivots about the tip touching the object's surface in a fixed position to the positions shown by the dashed lines, the positions of the tag 16 would be recorded as if they were points on the surface of the object. This may lead to inaccurate determinations of these points lying on the surface of the object when no data should have been sent.

Figure 4:
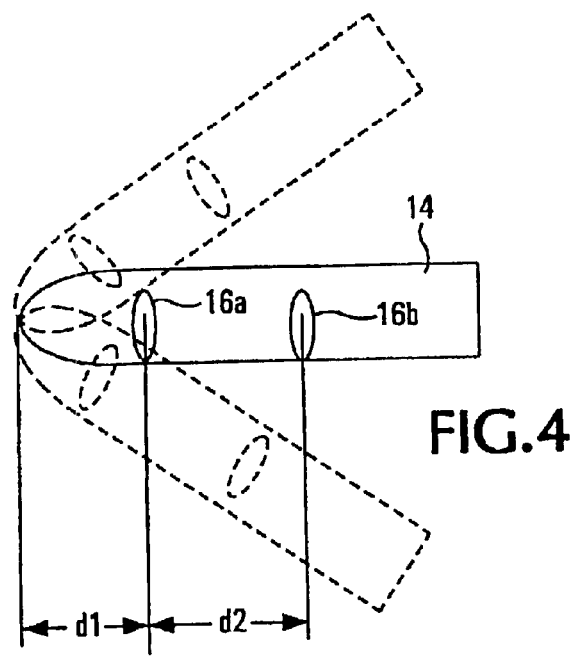
FIG. 4 shows an alternative embodiment of a stylus operable to be used in a three-dimensional modeling system in accordance with the invention.

An embodiment of the stylus 14 that would alleviate the rotational problem is shown in FIG. 4. In this example, the stylus 14 has two tags 16a and 16b. The additional tag allows the position signals sent by the tags to convey the orientation of the stylus. For example, the stylus rotates from the position shown to those shown by the dashed lines. In this example, two points would be collected, in a substantially simultaneous manner, for both the first and second positions. The processor would then be able to identify the orientation of the stylus and determine that the stylus is in contact with the same point on the surface of the object.

Significant time delays between reading the positions of the two tags relative to the speed of movement of the stylus can lead to problems. The second tag may have moved a sufficient amount from its position corresponding to the position from which the first tag was read. It may lead to imprecise information as to the location of the computed tip of the stylus. The same holds true for all tags used in the system. Ideally, all tags would be read at the same instant in time.

Figure 5:
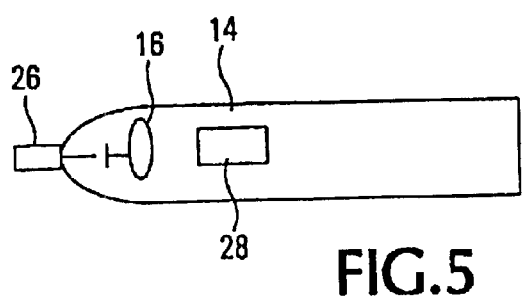
FIG. 5 shows another alternative embodiment of a stylus operable to be used in a three-dimensional modeling system in accordance with the invention.

An alternative embodiment of the stylus would be to have a pressure-activated switch mounted on the stylus as shown in FIG. 5. The tag or tags would only communicate passively or actively when the switch was depressed. The switch could be mounted anywhere on the stylus. It may be convenient to mount it in the tip of the stylus such as that shown at 26. In this manner, the tag would send signals when the stylus actually makes contact with the object being modeled. Alternatively, it could be mounted where shown at 28 as a switch or button to be depressed by the user's finger when a data point is to be sent. A touch switch in the tip of the stylus may work better for relatively hard or firm object surfaces. A finger-operated trigger may have advantages for softer object surfaces, where the surface would not have to be indented to activate the switch. This might lead to inaccurate surface information.

The variations on the placement and configuration of the tags in the stylus are left to the system designer. For example, the pressure-mounted switch will eliminate some of the processing necessary to discern between the points on the object and those described in the three-dimensional space by a tag that always communicates with the antenna. This problem would not be alleviated in any significant manner by the stylus having two tags, although a stylus could be used that has two tags and a pressure mounted switch. However, the pressure-sensitive switch may not be useful for children who do not understand or who do not consistently depress the switch. In addition, the switch may cause the stylus to be more fragile than if there are no moving parts.

Figure 6:
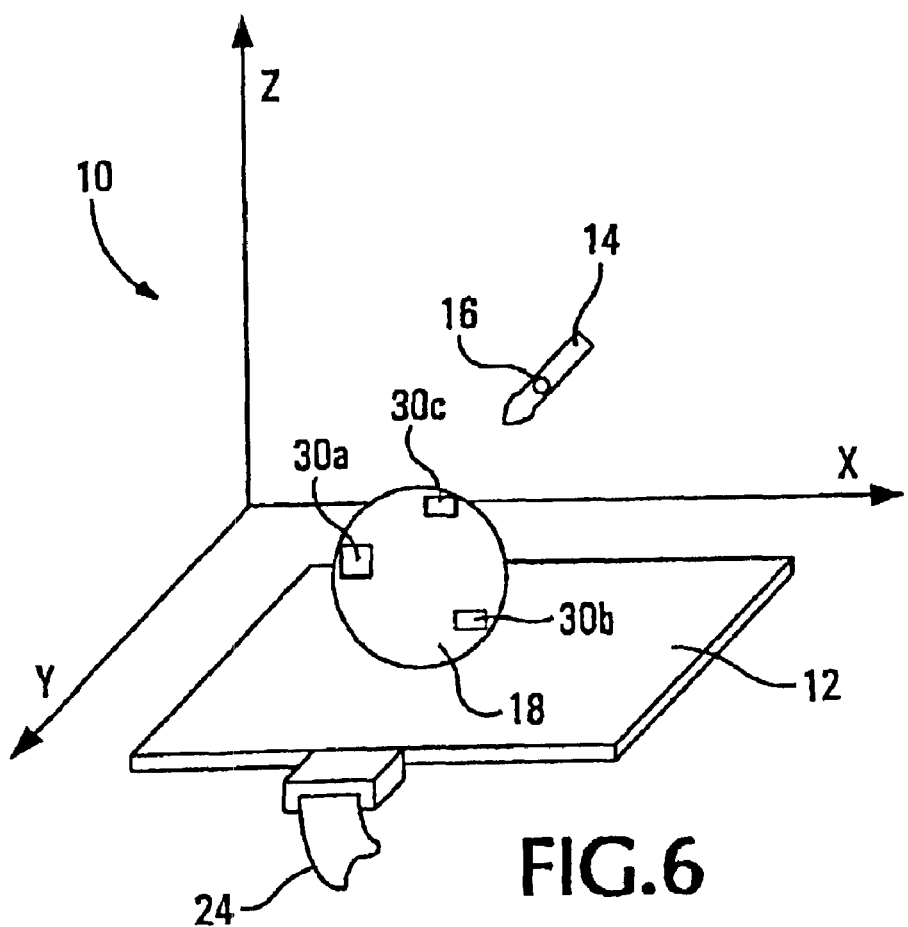
FIG. 6 shows another alternative embodiment of a three-dimensional modeling system in accordance with the invention.

In addition to consideration of rotation and orientation of the stylus, the system must consider rotation and motion of the object 18 from FIG. 1. In the description provided up to this point, the object has been assumed to be in a fixed position relative to the antenna. An embodiment of the invention providing tracking of the object is shown in FIG. 6. The modeling system 10 in this embodiment shows a single antenna and a stylus with one tag with no intention of limiting the invention. Any combination of the antenna, stylus embodiments and combinations of tag may be used. In this particular embodiment, tags are also attached to the object to be modeled.

One area of concern in previous embodiments is motion of the object. The user can either hold the object in one hand while tracing with the other, but this increases the likelihood of motion of the object. Object motion will require more processing power and time for the processor to check for errors and correct for any error, as well as determining if and when motion occurred to adjust the model accordingly. Alternatively, the user could place the object on a surface, or even on the antenna. However, this prevents the user from tracing the bottom surface of the object.

In the embodiment shown in FIG. 6, three tags 30a–30c are attached to the object in a non-collinear configuration. The use of one tag would not contribute significantly to improved object tracking. Two tags would result in a slight increase in accuracy but would not allow the processor to track any rotation about an axis formed by the two tags. Therefore, while other numbers of tags can be used and are within the scope of this disclosure, the discussion will assume that three tags will be used.

The object 18 is moved into the electromagnetic field 20 with the three tags 30a–30c attached to it. When the stylus 14 traces the surface of the object, the stylus tag will report the stylus position to the antenna. The tags attached to the object will report the object position and orientation within the antenna field. The processor would then be tracking four xyz points at each time, five if two tags are used in the stylus. This allows the processor to compute the stylus tip relative to the object using three-dimensional geometry. The user can now freely rotate the object and its attached tags as if 'painting' it into the model in pseudo-real time.

In any embodiments using more than one tag, the data collected will include other information in addition to the (x, y, z) position of the tag. With more than one tag, the data collected from each tag should be readily identifiable. A tag identification component could provide this information. While it is possible to identify the tag through a complicated and intensive process by reviewing it with respect to the other data points gathered, a tag identifier would avoid this processing. In addition to the (x, y, z) position collected, a time component should be recorded for each position. This allows the computer to processor to relate the points to each other in a series of snapshots of the tag positions. The processor would collect these five component tuples (id, x, y, z, time).

Once the data is collected, whether by multiple tags, multiple antennas or by a single tag and antenna, the processor will use that data to model the object. First, the processor may compute a list of (x, y, z) object surfaces positions. For a multiple-tag system, this will have to be determined from the list of (id, x, y, z, time) tuples referred to above. This list of (x, y, z) positions will be used to construct a three-dimensional model of the object using existing three-dimensional graphics computer modeling techniques, such as constructing a wire frame or mesh.

As the user traces the object, the system may have variable resolution. This may allow the user to trace fewer points for simple surfaces and more for complex surfaces. For example, the user may be able to monitor the model in pseudo-real time as the image of the model is portrayed on the screen of a computer. As points are selected, the user could see what areas require more detail or which may be sufficiently modeled with the points already selected. This makes the system more flexible and uses less processing resources to create the model.

Figure 7:
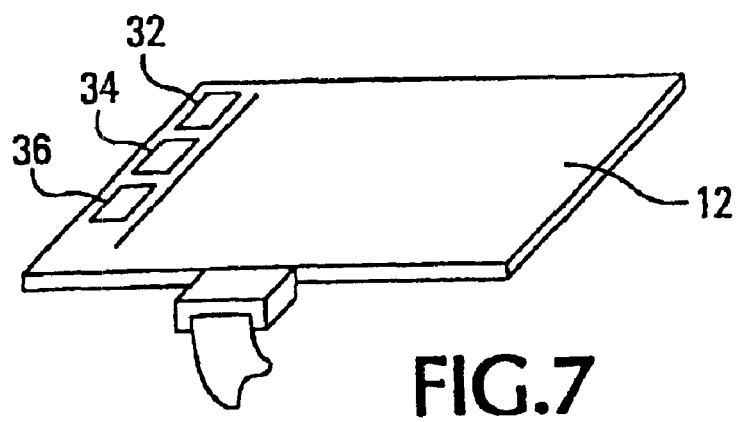
FIG. 7 shows one embodiment of an antenna with toolbox buttons in accordance with the invention.

Additionally, the user may choose to color or somehow alter the image created by the modeling process. A virtual toolbox may be presented to the user, either on the screen of a computer or by selection on the antenna. An example of such an antenna is shown in FIG. 7. Antenna 12 has an area off to the side of the electromagnetic field that has 'buttons 32, 34 and 36. These are not actually buttons, but predefined regions, which have been assigned a certain significance. Touching the stylus, and its tag, to the antenna will activate the function assigned to that button. Additionally, the toolbox need not be flat against the antenna. Any small two or three-dimensional area in the antenna's field may be designated as a virtual tool function.

For example, the user may be modeling an object of several different colors. As the user begins to model an area on the object that is blue, for example, the user could select button 32, which is the 'color' button. The user would then select the color blue from a provided palette of colors. The palette would probably appear on the computer system, but the antenna may have a small LCD screen or similar display device attached responsive to the selection of the color button to present the color palette. Buttons 34 and 36 may have other attributes associated with them such as textures and other special effects. These are just examples of the kind of added functions that would be made available to the user as part of the modeling system.

In this manner, an inexpensive and useful system for modeling objects in three-dimensions would be available to users. The system would not require the expensive cameras or precision turntables nor the sophisticated computer software require by most systems in use today. It would also be relatively easy to use, making it accessible to more people. Consumers would have a convenient way to model objects in three-dimensions for animation, web page images, or computer gaming applications, among many others.

Thus, although there has been described to this point a particular embodiment for a method and apparatus for a three-dimensional modeling system, it is not intended that such specific references be considered as limitations upon the scope of this invention except in-so-far as set forth in the following claims.

What is claimed is:

1. A stylus operable to trace outlines of an object, comprising:

at least one tag detectable by an antenna such that radio position signals are sent from the stylus to the antenna, located separate from the antenna, wherein the radio position signals are used to define the outline of the object; and a pressure-sensitive switch operable to cause the tag to send the radio position signals when the switch is activated.

2. The stylus of claim 1 wherein the at least one tag further comprises two tags.

3. The stylus of claim 1 wherein the pressure-sensitive switch is mounted such that touching the stylus to the object activates the switch automatically.

4. The stylus of claim 1 wherein the pressure-sensitive switch is mounted such that the switch is activated by pressure from a user.

5. The stylus of claim 1, wherein the at least one tag is a passive tag extracting power from an electromagnetic field generated by the antenna.

6. The stylus of claim 1, wherein the at least one tag is an active tag providing its own power.

\* \* \* \* \*